June 11, 1963 G. LIPPMAN 3,093,530
APPARATUS FOR THE MANUFACTURE OF BINDERS
Filed June 30, 1961 3 Sheets-Sheet 1

INVENTOR
GERALD LIPPMAN
BY
ATTORNEYS

June 11, 1963  G. LIPPMAN  3,093,530
APPARATUS FOR THE MANUFACTURE OF BINDERS
Filed June 30, 1961  3 Sheets-Sheet 2
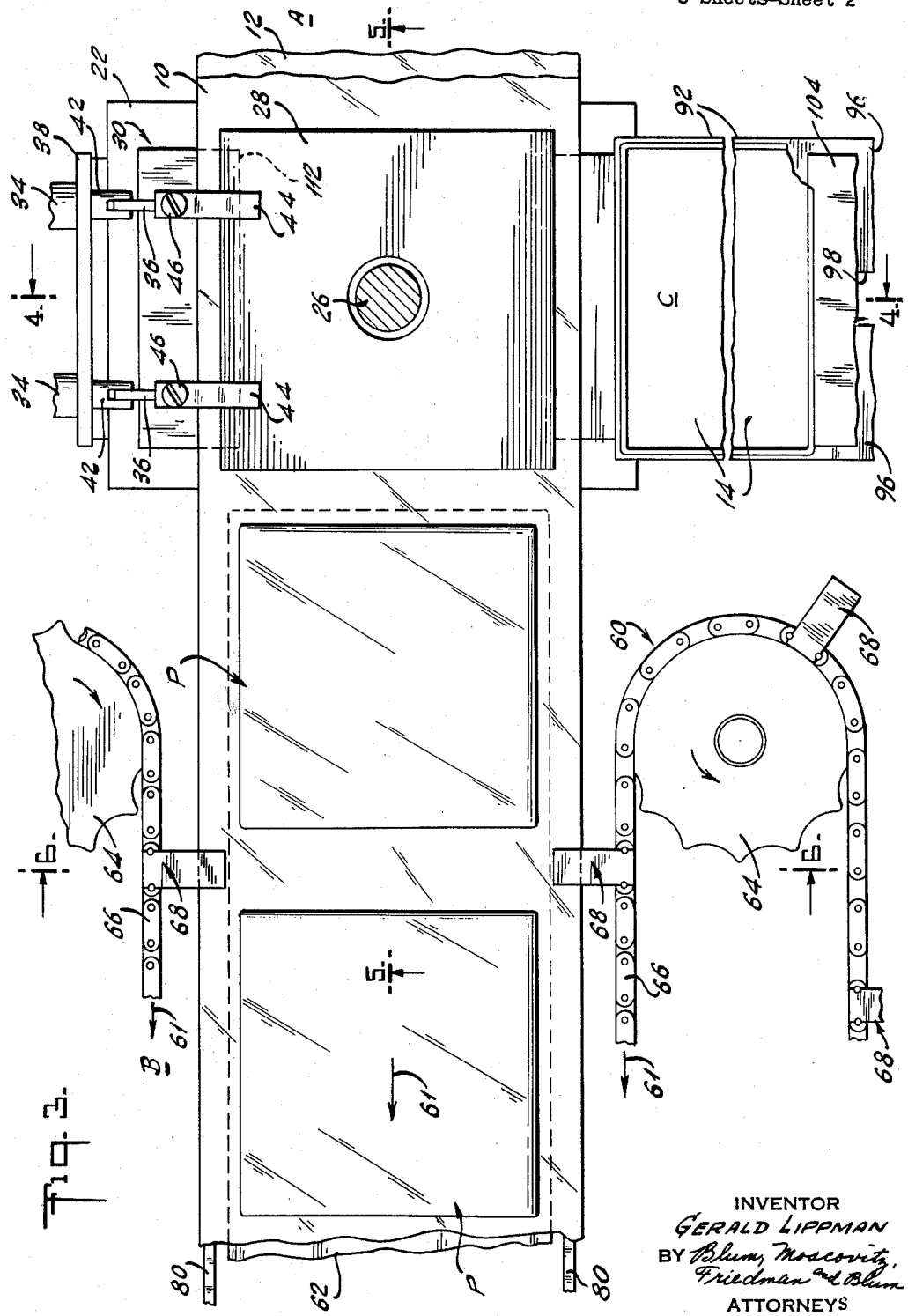
INVENTOR
GERALD LIPPMAN
BY Blum, Moscovitz,
Friedman and Blum
ATTORNEYS

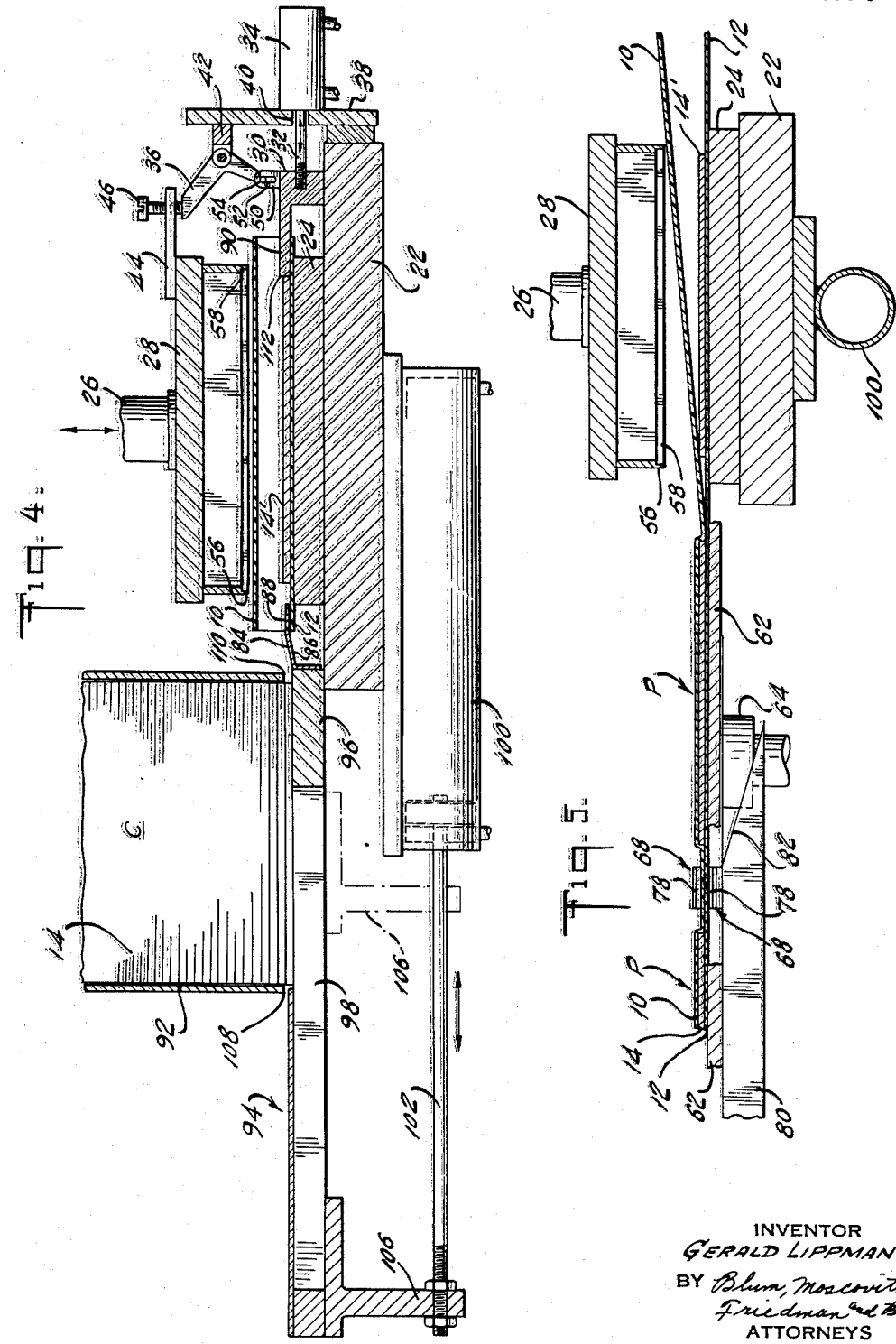

United States Patent Office 3,093,530
Patented June 11, 1963

3,093,530
APPARATUS FOR THE MANUFACTURE OF BINDERS
Gerald Lippman, 3403 2nd St., Oceanside, N.Y.
Filed June 30, 1961, Ser. No. 122,385
12 Claims. (Cl. 156—383)

This invention relates to improvements in the manufacture of binders.

More particularly, the invention is concerned with the automatic manufacture of binders for use in making notebooks and book covers, the binders comprising a pair of plastic sheets having a relatively stiff board member disposed therebetween.

It is an object of the present invention to facilitate the manufacture of binders, especially to reduce the number of manufacturing steps required to place and secure a board within the outer covering material.

A further object of the invention is to seal and cut the outer covering material in which the board is sealed in a single step operation.

The invention is primarily concerned with novel methods of and apparatus for the continuous manufacture of binders by placing a board structure between a pair of plastic sheets fed from directions transversely of each other. A pressing apparatus is provided in which the die has a peripheral sealing edge coextensive with the board structure to be sealed between the pair of plastic sheets. The plastic sheets are supplied from one side of an operating station at which the die is located and is withdrawn from the other side of the operating station by a conveyor mechanism carrying grippers to grip a completed sandwich unit formed of the board structure sealed between the plastic sheets. The board structures are fed individually from a magazine or hopper located on a third side of the operating station intermediate the feed and withdrawal sides of the plastic sheets. Separation devices are provided to maintain the plastic sheets spaced from each other at the operating station, one of the separation devices also acts as a board structure positioning device to insure alignment between the outer peripheral edge thereof and the peripheral sealing edge of the die. Means are provided interconnecting the die and the board structure positioning device which is operative for withdrawal thereof to permit the two plastic sheets to be sealed together at the outer peripheral edge of the board structure, after which the completed sandwich unit formed of the two plastic sheets and interspersed board structure is withdrawn from the operating station and another pair of plastic sheets and board structure is positioned at the operating station, whereby to repeat the cycle of operation.

The objects, advantages and nature of the invention will be more fully understood from the following description of a preferred embodiment of the invention, shown, by way of example, in the accompanying drawings, in which:

FIG. 3 is a plan view of a machine embodying the invention, certain parts being omitted for the sake of clarity, for producing the product of FIG. 2.

FIG. 4 is a longitudinal sectional view taken on line 4—4 of FIG. 3 illustrating the board feed path and the mechanism for feeding the board.

FIG. 5 is a transverse sectional view taken on line 5—5 of FIG. 3 illustrating the withdrawal path of the sandwich unit composed of the pair of plastic sheets with the board pressed therebetween.

Figure 2:
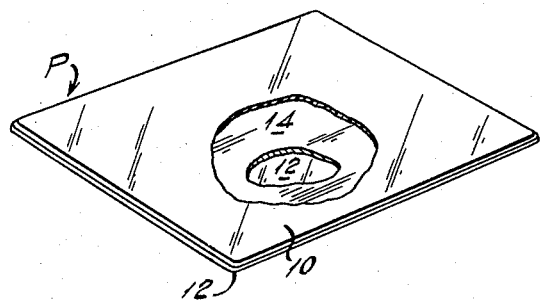
FIG. 2 is a perspective view, parts of which are broken away, of the final product produced in accordance with the invention illustrating the center board sandwiched between the plastic sheets and sealed therein.
Figure 6:
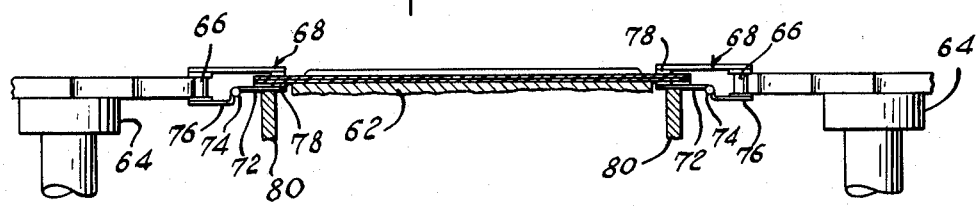
FIG. 6 is a longitudinal sectional view taken on line 6—6 of FIG. 3 illustrating a gripping mechanism for holding the edges of the plastic sheets while the sandwich unit is moved along the withdrawal path.
Figure 7:
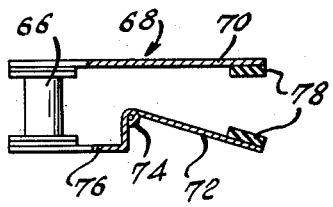
FIG. 7 is an enlarged detail view of one gripper of the gripping mechanism shown in FIG. 6, the gripper being shown in its open position.

Referring now more particularly to the drawings, FIGS. 3 to 7 illustrate the best mode now contemplated for producing the final product P of FIG. 2 which comprises a pair of outer plastic members or sheets 10 and 12 having a board member or structure such as a cardboard member 14 sandwiched and sealed therebetween.

Figure 1:
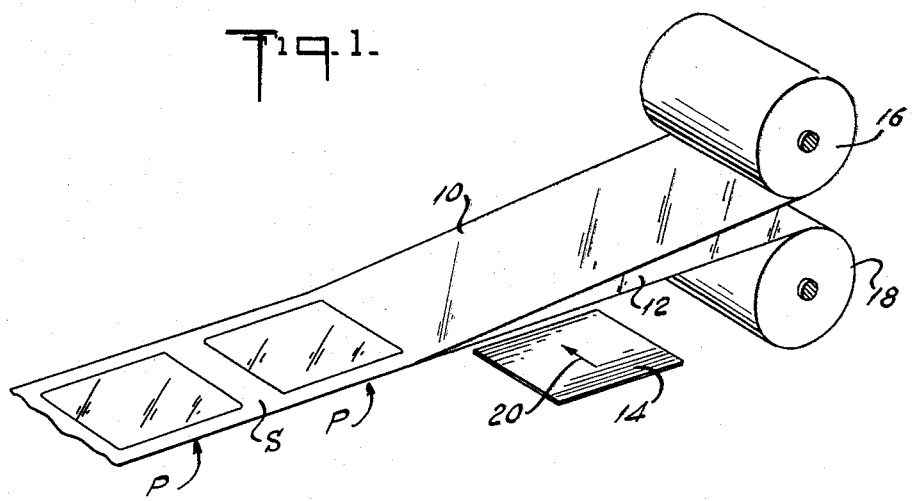
FIG. 1 is a diagrammatic view illustrating the relationship of the feed paths of a pair of plastic sheets between which a center board is to be inserted in accordance with the invention.

The method of feeding the plastic sheets and board and the relationships of their paths of movement is shown in FIG. 1. Plastic sheets 10 and 12 are removed from supply rolls 16 and 18, respectively, and brought together into juxtaposed relationship to each other, but spaced from each other. The plastic sheets are moved in a first path, the direction of which is substantially normal to the axes of rolls 16, 18, while the board 14 is moved in a second path in a direction transverse to the first path. While it is preferred to have the second path of movement extend in a direction indicated by arrow 20 and substantially parallel to the axes of rolls 16 and 18, the important feature of the invention is to have the board 14 moved between the spaced sheets 10 and 12 from a direction which is different from the direction of movement of the sheets.

While sheets 10 and 12 are shown as clear plastic laminates, it is obvious that they may be opaque. In the same vein, board 14 may be provided with printing or other suitable markings and used with clear plastic laminates.

The machine of the invention includes means to be described hereinafter which will seal board 14 between sheets 10 and 12. It will be noted that the final products P are interconnected but spaced from each other by means of a spacer or intermediate portion S which is formed from the two sheets 10 and 12. The sheet portions in portion S are not sealed to each other. After the board 14 is placed between the sheets 10 and 12 a peripheral sealing operation is performed by the apparatus as will be described hereinafter. Simultaneously with the performance of the peripheral sealing operation a tear edge is made so that excess material may be stripped from the sealed edge. Where it is desired to have two final products P interconnected by means of the portion S, the peripheral sealing operation is performed in such a way that the sealed edges formed along the portion S do not define a tear edge, with tear edges being defined solely along the portion of products P not interconnected by the portion S. It is possible, therefore, to form a single side for a book cover or binder or to form two sides for the book cover or binder with the portion S forming the center or back part for the book cover or binder. If desired, a board structure (not shown) such as board 14 may be fed between plastic sheets 10 and 12 to provide a hard backing for the center element.

Referring now more particularly to FIGS. 3 to 7 which illustrate the preferred embodiment of a machine for feeding and withdrawing the pair of spaced-apart plastic sheets 10 and 12 in the first direction to an operating station and for feeding the cardboard 14 automatically between the plastic sheets at the operating station, the machine includes a press portion A, at the operating station, a plastic sheet feed and withdrawal portion B to feed the sheets to the press portion A from the right end and to withdraw the sheets from the left end of the press portion and a board sheet or structure feed portion C for feeding boards to the press portion A in a direction transverse to the direction of feed and withdrawal of portion B.

The press portion A includes a press bed 22, a die base 24 supported on the press bed, a reciprocating die carrier 26 for supporting a die 28 for vertical movement relative to the base. Reciprocation of carrier 26 moves the die 28 to its lower position as shown in phantom. A board positioning device 30 is mounted for reciprocation along die base 24 and is coupled to piston rod 32 of a double-acting piston-cylinder assembly 34. A dual piston-cylinder assembly may be provided for greater control in operation. The base portion of the positioning device is retained for sliding movement on press bed 22 by means of a pair of two-armed levers 36, and a plate member 38 fixed to the press bed 22. Plate member 38 is provided with an opening 40 through which the piston rod 32 passes and is guided during its reciprocatory movement. Plate member 38 has fixed thereto a fulcrum 42 for each lever 36, the connection point of the two arms being pivotally coupled to the fulcrum 42. Coupled to die 28 is an extension 44 carrying an adjustable actuating screw 46 disposed to actuate levers 36 on the downtake of the die. The top portion of the positioning device 30 is provided with a coupling extension 50 having an elongated aperture or guideway 52 for receiving a pin 54 which is coupled to the other arm of levers 36. Lowering of the die 28 causes the positioning device 30 to be moved to the right by means of levers 36 supplemented by assembly 34. Die 28 is provided with a peripheral sealing edge 56 having an L-shaped indented portion 58.

Referring now more particularly to FIGS. 3 and 5 to 7, the plastic sheet feed and withdrawal portion B includes a pair of endless conveyor mechanisms 60 positioned on opposite sides of a guide plate 62 for withdrawing sheets 10 and 12 from rolls 16 and 18, not shown in these figures. While rolls 16 and 18 are not shown, it is to be understood that these are located to the right of the press bed 22 and the conveyor mechanism 60 is located at the opposite side or to the left of the press bed, as shown in FIG. 3. Each of the conveyor mechanisms 60 includes a pair of sprocket wheels 64, one of which is shown, an endless chain belt 66 and a gripping mechanism 68 coupled to belt 66 at spaced intervals therealong for gripping the edges of plastic sheets 10, 12 and removing the plastic sheets from their respective rolls for moving them to a position underneath the die 28 and on top of the die base 24.

Gripping mechanism 68 includes an upper stationary member or arm 70 connected to the belt 66 and a lower member or arm 72 which is pivotally coupled at a pivot connection 74 to a lower stationary member 76 connected to the belt 66. Arms 70 and 72 are provided at their outer end portions with resilient gripping pads 78 facing each other. A pair of guide rails 80 are positioned on opposite sides of the guide plate 62 and engage the underside of the lower arm 72 to move it into a position closing the arms with sheets 10 and 12 gripped between pads 78. Guide rails 80 are provided with a forward cam surface 82 and a rear cam surface (not shown).

The forward cam surface 82 is effective to cause arm 72 to pivot in a direction towards arm 70 to grip sheets 10 and 12 as they are brought into position, under the die 28, by means of the other grippers which lead the open grippers in the direction of travel of belt 66 towards the left as shown by the arrows 61 whereby to draw the sheets 10 and 12 from their respective rolls 16 and 18. The rear cam surface functions in a manner so as to cause the lower arm 72 to pivot in a direction away from arm 70 to release the edges of sheets 10 and 12 after the trailing grippers have firmly gripped the edges of sheets 10 and 12. The pressure of the guide rails 80 on arms 72 is effective to cause the pads 78 to grip therebetween the sheets tightly for movement thereof in a direction with the conveyor belts 66 towards the die 28.

To assist the separation of sheets 10 and 12 as they are moved towards the press bed, separation means are provided which include a first separation member 84 having an arched portion 86 for a purpose to be explained hereinafter and a straight portion 88 and a second separation member formed from the leg portion 90 of positioning device 30. The straight portion 88 of the first separation member and the leg portion 90 of the positioning device 30 each have upper and lower face surfaces for initially engaging sheets 10 and 12 so as to cause them to effect a slight separation whereby to permit the board 14 to be inserted therebetween at the press portion A by means of the board feed portion C.

Referring now more particularly to FIGS. 3 and 4 which illustrate the board sheet feed portion C and generally includes a hopper or magazine 92 arranged to carry a stock of boards 14 and a reciprocating board pusher mechanism 94 arranged to remove the boards 14 individually from the hopper 92 to position it under the die 28 between sheets 10 and 12 as shown at 14'. Hopper 92 is supported on a platform 96 having a transverse guideway 98.

A reciprocating piston-cylinder mechanism 100 is provided which may be suitably affixed beneath the press bed 22 with the piston rod 102 being coupled to the board pusher mechanism 94. Piston-cylinder assembly may be operated by any suitable means such as pneumatic means. The board pusher mechanism includes a pusher plate 104 which slides on top of platform 96, a connecting member 106 shaped in the form of a T, the top portion of which slides within the transverse guideway 98 and is connected to pusher plate 104 and the leg portion of which is connected to the piston rod 102. Hopper 92 is provided with slot portions 108 and 110 on two of its sides at the base for permitting the pusher plate 104 to enter the hopper 92 to engage the lowermost board therein and cause the aforesaid lowermost board to be pushed out of the hopper through the slot portion 110 and ride over the top surface of the first separation member 84 and into engagement with a reference edge 112 on the leg portion 90 of the separation device 30. The extent of travel of the connecting member 106 is also limited by the longitudinal extent of the transverse guideway 98 with member 106 being shown in phantom after positioning a board 14 between the sheets 10 and 12 beneath the die 28. Piston rod 32 and positioning device 30 are provided with complementary screw thread portions to permit lateral adjustment of the edge 112 whereby to locate the board 14 in a predetermined position under die 28.

*Operation*

The pair of plastic sheets 10 and 12 are fed to the press portion A from the pair of rolls 16 and 18 having wrapped thereon continuous sheets of plastic from which the outer covering of the binder is to be constructed. The sheets 10 and 12 are pulled past the press portion A from one side thereof to the opposite side thereof by means of the gripping mechanism 68 and its associated parts. The lower sheet 12 engages the underside of the first and second separation members and particularly the underside of straight portion 88 and the underside of leg portion 90. The first sheet 10 engages the top side of straight portion 88 and the top side of leg portion 90 so that the sheets 10 and 12 are maintained physically separated to permit the passage of the board 14 therebetween at the press portion A as indicated by board 14'. Any well known suitable indexing means may be used to withdraw a predetermined length of plastic sheet from the two rolls. It will be understood that the length of the sheet to be withdrawn is determined by the size of the final product P and the intermediate or spacer portion S. Feed and withdrawal of the plastic sheets takes place in a direction transverse to the press bed 22.

Sprocket wheels 64 are rotated by any suitable means so as to move the sheets 10 and 12 in the direction of arrow 61. The lower member 72 of the gripping mechanism is arranged to pivot freely as a result of gravity with respect to stationary member 76 about pivot connection 74. The forward cam surface 82 of each guide rail is effective to engage the underside of the lower member 72 as it rides up the cam surface onto the guide rails and close the jaws of members 70 and 72 to grip the edges of the plastic sheets with sufficient force to prevent the plastic sheets from becoming disengaged from the gripping mechanisms 68. To insure a further gripping action, the jaws of members 70 and 72 are provided with the suitable resilient pads 78.

At each indexed feed of the plastic sheets, piston-cylinder assembly 100 is effective to cause the piston rod 102 to be retracted into the cylinder to project one of the boards 14 to the position of the board as indicated by 14' between the sheets 10 and 12. The board pusher mechanism 94 is of a width sufficient to engage the edge portion of the lowermost board 14 in the hopper or magazine 92 by passing through the slot portion 108 thereof and to eject the aforesaid lowermost board 14 by moving it out of the hopper through the slot portion 110 thereof. The aforesaid lowermost board 14 rides over the top of the arched portion 86 of the first separation member for positioning between the plastic sheets at the press portion A or operating station. The movement of the board is limited such that the aforesaid lowermost board is positioned at 14' by means of the reference edge 112 on the positioning device 30. The location of the reference edge 112 may be varied by rotating the piston rod 32, which for this purpose there are provided complementary threaded portions within the positioning device 30 and on the piston rod 32. As will be explained further hereinafter, the location of the reference edge 112 is such to position the board 14 in position for alignment or registry with the peripheral sealing edge 56 of the die.

After the board 14 is positioned at the operating station as indicated by board 14', the indexing means is effective to cause the die carrier 26 to descend towards the die base 24 whereby to engage the upper sheet 10 and press the same against the sheet 12 and peripherally seal the two sheets together along lines defined by the edges of board 14' and the peripheral sealing edge 56. As mentioned heretofore, the peripheral sealing edge 56 may form two or four tear edges in addition to sealing the board peripherally between the two plastic sheets. As the die carrier 26 descends, the extension 44 coacts with the two-armed levers 36 to move the positioning device 30 out of the path of movement of the die 28 and the peripheral sealing edge 56. Thus, the positioning device 30 functions to position one of the boards or cardboards 14 at the operating station and on an operating cycle is actuated out of the path of movement of the die. As the die 28 descends, the end of the two-armed levers 36 are rotated in a counterclockwise direction about fulcrum 42. Pin 54 which is connected to the other arm of the two-armed lever rides down in guideway 52 and causes the positioning device to be moved to the right with the piston rod 32 into the cylinder of the piston-cylinder assembly 34.

Subsequent to the sealing operation, the indexing means is effective to cause the die carrier to be returned to its initial position and to cause the positioning device 30 to be returned to its initial position for a repetition of the entire operation. The piston-cylinder assembly 34 is energized to cause the piston rod 32 to be moved out of the cylinder and to return the device 30 to its initial position. As the die carrier returns to its initial position, the gripping mechanism 68 and the endless belt 66 are effective to withdraw the completed sandwich unit from the operating station and to place other portions of sheets 10 and 12 at the operating station, which other portions are withdrawn from their associated rolls simultaneously with the removal of the sandwich unit or finished product.

The positioning device 30 also acts as a safety stop to prevent sealing edge 56 from being inadvertently moved into position prior to removal of the positioning device by the lowering of the die carrier 26 should the two-armed lever 36 become disconnected from the positioning device 30.

After the positioning device 30 is withdrawn and the die 28 is lowered into position to perform the sealing operation, the L-shaped indented portion 58 permits the peripheral sealing edge 56 to engage solely the top sheet 10 and seal it to sheet 12. The indented portion 58 is effective to fold the top sheet 10 over the edge of board 14' so that the edge 56 can perform its function of sealing the plastic sheets 10 and 12 together with the board 14' sandwiched therebetween to form a sandwich unit or binder. Edge 56 is, as mentioned heretofore, also effective to provide a tear edge so that each sandwich unit may be severed from the others and the portions of the plastic sheets 10 and 12 which do not cover any portion of the board may be removed. If it is desired to have the spacer or intermediate portion S connected with the final product P or sandwich unit, edge 56 may be so arranged as to provide a tear edge solely along the length portions of the plastic sheets and not the width portions. The width portions may then be severed by any other suitable means.

After the sealing operation, the positioning device 30 is returned to its initial position by means of piston-cylinder assembly 34. In this connection it will be noted that on the downstroke of the die 28, the positioning device 30 is moved out of the path of die movement by lever 36 through screw 46 supplemented by the actuation of piston of assembly 34 on fluid admission thereto through the port proximate to the piston rod; on the upstroke of the die 28 the positioning device 30 is returned to its initial position solely by the actuation of assembly 34 on fluid admission thereto through the opposite port. If desired, the assemblies 34 and 100 may be operatively coupled to each other to provide the aforedescribed cycle of operation. For this purpose, a suitable indexing means is provided to return the die carrier 26 to its initial position and to cause the piston rod 32 to return the positioning device 30 to its initial position. Simultaneously with the return of the die carrier to its initial position, one operation is completed and the next operation is commenced. Other portions of sheets 10 and 12 are then fed to the operating station at the press portion A and another board 14 is moved to the position of the board 14' whereby to provide for continuous sequential operation and sealing of the boards 14 individually between the pairs of plastic sheets 10 and 12.

The board structure 14 is preferably fed simultaneously with the feed of the plastic sheets 10 and 12, although for certain purposes, it is within the scope of this invention to perform the feeding of the board structure subsequent to the feeding of the plastic sheets 10 and 12.

While there has been described what is at present considered to be the preferred embodiment of this invention, it will be obvious to those skilled in the art that various changes and modifications may be made therein without departing from the spirit and scope of the invention.

Having thus described my invention, what I claim and desire to secure by Letters Patent is:

1. Apparatus for the automatic manufacture of binders formed of a board structure encased within a pair of plastic sheets to form a sandwich unit, comprising a press portion, a plastic sheet feed portion and a board structure feed portion; said sheet feed portion including means to feed a portion of said pair of plastic sheets in spaced relationship to said press portion; said board structure feed portion including means operatively associated with said first-mentioned means to feed a board structure to said press portion between said portion of said pair of plastic sheets; and said press portion including a die means, said die means including a peripheral sealing edge having a periphery complementary with the periphery of said board structure, and means to bring said peripheral sealing edge into operative engagement with one of said plastic sheets to seal said one plastic sheet to the other of the plastic sheets along the periphery of said board structure to form said sandwich unit, wherein said plastic sheet feed portion includes a pair of plastic sheet supply rolls positioned on one side of said press portion and a conveyor mechanism for drawing said plastic sheets past said press portion positioned on another side of said press portion, opposite to said one side, said conveyor mechanism including grippers which grip the edges of the plastic sheets and remove the completed sandwich unit from said press portion; said board structure feed includes a board structure magazine adapted to contain a plurality of board structures, said magazine being positioned on a third side of said press portion whereby to feed said board structures in a direction transverse to the direction of feed of said plastic sheets, said magazine having a pair of slots in the base thereof in registry with each other, a board pusher mechanism operatively associated with said magazine arranged to enter one of said slots for ejecting the lowermost board structure through said other slot for positioning at said press portion; and said press portion including a die base, a reciprocating die vertically movable relative to said die base, a peripheral sealing edge coupled to said die, a movable board structure positioning and plastic sheet separation device arranged on one side of said die base, a stationary plastic sheet separation unit cooperating with said separation device positioned on the other side of said die base, said device being positioned in the path of feed of said board structure to limit the extent of travel of said board structure by engagement therewith whereby to position it in alignment with said peripheral sealing edge, said separation unit and said device cooperating with each other to separate said plastic sheets as they are drawn past said press portion by said conveyor mechanism, lever means coupling said device to said die and responsive to the lowering of said die to remove said device out of engagement with said board structure whereby to permit said peripheral sealing edge to engage the top plastic sheet for sealing with the bottom plastic sheet along the peripheral edge of the board structure.

2. Apparatus for the automatic manufacture of binders formed of a board structure positioned between a pair of plastic sheets to form a sandwich unit, the sandwich unit being formed at an operating station, comprising a press portion at the operating station; means to feed plastic sheets to the operating station and means to feed board structures to the operating station in timed relationship with said first feed means; said press portion comprising a press bed, a die base positioned on said press bed, a reciprocating die carrier positioned above said die base, a die having a peripheral sealing edge coupled to said die carrier, a first separation device positioned at the operating station, a second separation device having a reference edge positioned on said die base, said second separation device being movable on said press bed, means coupling said second device to said reciprocating die carrier to move said reference edge out of the path of travel of said die carrier, said first and second separation devices being effective to maintain the plastic sheets in spaced relationship and to position one of the board structures between the plastic sheets at the operating station, said reference edge locating the board structure in alignment with the peripheral sealing edge at the operating station.

3. Apparatus for the automatic manufacture of binders formed of a board structure positioned between a pair of plastic sheets to form a sandwich unit, the sandwich unit being formed at an operating station, comprising a press portion at the operating station, a plastic sheet feed portion arranged to feed the pair of plastic sheets past said press portion in a first direction and a board structure feed portion arranged to feed an individual board structure sequentially in timed relationship in a second direction which is transverse to the first direction, means at said press portion to maintain the plastic sheets separated from each other and to control the positioning of the individual board structures at the operating station and means to remove a completed sandwich unit from the operating station and to position another portion of the plastic sheets and another board structure at the operating station said means comprising a conveyor mechanism, said conveyor mechanism including grippers which grip the edges of the plastic sheets and remove the completed sandwich unit from said press portion.

4. Apparatus as claimed in claim 3 wherein said first-mentioned means includes first and second separation devices arranged to maintain the plastic sheets in spaced relationship at the operating station and effective to guide the board structure for positioning between the plastic sheet portions at the operating station.

5. Apparatus as claimed in claim 4, wherein said press portion includes die base means, reciprocating die carrier means arranged to reciprocate on said die base means and lever means coupling said second separation device to said die carrier means for movement out of the path of reciprocation thereof, said first separation device being in fixed relationship to said die base means and cooperating with said second separation device in its moved position to maintain the plastic sheets separated.

6. Apparatus as claimed in claim 5, wherein the removing means includes a pair of endless conveyor mechanisms, gripping devices coupled to said conveyor mechanisms, a guide rail for each said conveyor mechanisms arranged to operate the opening and closing of said gripping devices, said gripping devices gripping the ends of the plastic sheets for withdrawal of the completed sandwich unit from the operating station, said conveyor mechanism being positioned on one side of said press portion and the plastic sheet feed portion includes a pair of plastic sheet supply rolls positioned on the other side of said press portion such that the withdrawal of the completed sandwich unit positions another portion of the pair of plastic sheets at the operating station.

7. Apparatus as claimed in claim 6, wherein said board structure feed portion includes a board structure hopper adapted to contain a plurality of board structures, said hopper being positioned on a third side of said press portion between said pair of plastic sheet supply rolls and said conveyor mechanism, said hopper having a pair of aligned slot portions, pusher means operatively associated with said hopper arranged to enter one of said slot portions to eject the lowermost board structure in said hopper through the other of said slot portions over said first separation device between the plastic sheets and into engagement with said second separation device at the operating station.

8. Apparatus as claimed in claim 7, including a platform, said hopper being carried by said platform, a transverse guideway in said platform passing beneath said hopper in a direction transverse to said pair of aligned slot portions, said pusher means being operatively associated with said guideway and arranged to move in said guideway along said platform, said first separation device being connected to the end of said platform and including an arched portion and a straight portion, said straight portion being adjacent to said die base means to guide the board structure removed from said hopper over said straight portion and said arched portion onto the lower of the two plastic sheets at the operating station, said second separation device including a reference edge limiting the extent of movement of the board structure at the operating station for positioning it in cooperative relationship with said die means.

9. Apparatus as claimed in claim 8, wherein said die means includes a die carrier, a die carried by said die carrier and a peripheral sealing edge on said die carrier, said die base means includes a press bed and a die base on said press bed, said second separation device including a leg portion coupled to said reference edge, said lever means being effective to move said reference edge out of the path of movement of said peripheral sealing edge as it is brought into engagement with the upper of the two plastic sheets to seal the portions of the plastic sheets at the operating station along the periphery of the board structure whereby to form the sandwich unit.

10. Apparatus as claimed in claim 9, wherein said lever means includes a plate member fixed to said press bed, a fulcrum fixed to said plate member, a two-armed lever pivotally coupled to said fulcrum, one arm of said lever being pivotally coupled to said die carrier and the other arm of said lever being coupled to said second separation device, whereby lowering of said die carrier towards said die base pivots said two-armed lever about said fulcrum to move said second separation device in a direction transverse to the movement of said die carrier and out of the path of movement thereof.

11. Apparatus as claimed in claim 10, including a first extension having an elongated guideway coupled to said die carrier, a first pivot pin fixed at the end of said one arm and slidable within said guideway, a second extension having an elongated guideway coupled to said second separation device, a second pivot pin fixed at the end of said other arm and slidable within said second-mentioned guideway, whereby the movement of said die carrier towards said die base slides said first pivot pin along said first-mentioned guideway thereby rotating said lever on said fulcrum, said plate member having an opening therethrough, a piston rod passing through said opening guided for movement thereby and coupled to said second positioning device, said second pivot pin and said second extension cooperating with said piston rod to maintain the movement of said second separation device along said press bed.

12. Apparatus as claimed in claim 11, including a first piston-cylinder assembly connected with said piston rod and a second piston-cylinder assembly connected with said pusher means, said first and second piston-cylinder assemblies being operative together to position said second separation device in its initial position at the operating station and to eject the lowermost board structure from said hopper onto said die base into engagement with said reference edge, said conveyor mechanism being operative with said piston-cylinder assemblies to position other portions of the plastic sheets at the operating station withdrawing them from said supply rolls and removing the previously completed sandwich unit.

References Cited in the file of this patent
UNITED STATES PATENTS

| | | |
|---|---|---|
| 2,336,962 | Salfisberg | Dec. 14, 1943 |
| 2,976,199 | Rand | Mar. 21, 1961 |
| 2,977,271 | Lutwack | Mar. 28, 1961 |